United States Patent
Phillips et al.

(10) Patent No.: US 12,300,082 B2
(45) Date of Patent: *May 13, 2025

(54) REMOTE VIDEO TRIGGERING AND TAGGING

(71) Applicant: Digital Ally, Inc., Lenexa, KS (US)

(72) Inventors: Steven L. Phillips, Olathe, KS (US); James W. Farnham, IV, Olathe, KS (US)

(73) Assignee: Digital Ally, Inc., Lenexa, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/236,970

(22) Filed: Aug. 23, 2023

(65) Prior Publication Data
US 2023/0394943 A1    Dec. 7, 2023

Related U.S. Application Data

(63) Continuation of application No. 17/243,855, filed on Apr. 29, 2021, now Pat. No. 11,769,383, which is a continuation of application No. 16/534,761, filed on Aug. 7, 2019, now Pat. No. 11,024,137.

(60) Provisional application No. 62/836,913, filed on Apr. 22, 2019, provisional application No. 62/716,277, filed on Aug. 8, 2018.

(51) Int. Cl.
*G11B 27/10* (2006.01)
*G06K 19/077* (2006.01)
*G08B 13/196* (2006.01)

(52) U.S. Cl.
CPC ... *G08B 13/19669* (2013.01); *G06K 19/0775* (2013.01); *G06K 19/0776* (2013.01); *G06K 19/07786* (2013.01); *G08B 13/19656* (2013.01); *G08B 13/1966* (2013.01); *G08B 13/19667* (2013.01); *G08B 13/19691* (2013.01)

(58) Field of Classification Search
CPC ........ G08B 13/19669; G08B 13/19667; G08B 13/19656; G08B 13/19691; G08B 13/1966; G08B 27/006; G08B 13/19671; G08B 13/19658
See application file for complete search history.

(56) References Cited

U.S. PATENT DOCUMENTS

| | | | | |
|---|---|---|---|---|
| 8,446,516 | B2* | 5/2013 | Pitts | H04N 7/01 396/89 |
| 10,298,834 | B2* | 5/2019 | Pitts | H04N 23/61 |
| 10,366,586 | B1* | 7/2019 | Leizerovich | G06V 20/52 |
| 2006/0070110 | A1* | 3/2006 | Mercer | H04N 7/185 348/E7.086 |

(Continued)

*Primary Examiner* — Howard D Brown, Jr.
(74) *Attorney, Agent, or Firm* — Erise IP, P.A.

(57) ABSTRACT

A video collection system collects and sends metadata related to video data such that recording may be triggered and tagged. The video collection system utilizes a mobile broadband network (such as a cellular network) to send metadata, receive triggers, and perform other functions while the video collection system is in the field. The video collection system broadly comprises a plurality of video cameras and a video collection manager. The video cameras each include a mobile broadband modem or other wireless communication element for sending metadata messages. In some embodiments the mobile broadband modem may also send still images, audio data, and video data.

20 Claims, 4 Drawing Sheets

(56) References Cited

U.S. PATENT DOCUMENTS

| | | | |
|---|---|---|---|
| 2010/0158486 A1* | 6/2010 | Moon | H04N 21/4147 386/241 |
| 2012/0014659 A1* | 1/2012 | Hugosson | H04N 7/188 386/E5.069 |
| 2014/0169752 A1* | 6/2014 | May | G06F 16/7867 386/224 |
| 2015/0168144 A1* | 6/2015 | Barton | H04N 1/00204 348/144 |
| 2016/0042621 A1* | 2/2016 | Hogg | H04N 23/64 348/155 |
| 2016/0042767 A1* | 2/2016 | Araya | H04N 7/181 386/201 |
| 2016/0064036 A1* | 3/2016 | Chen | H04N 7/185 386/241 |
| 2016/0092582 A1* | 3/2016 | Taber | G06F 16/9537 707/755 |
| 2016/0322081 A1* | 11/2016 | Schileru | H04N 21/812 |
| 2017/0006327 A1* | 1/2017 | Aghdasi | H04N 21/6175 |
| 2017/0230605 A1* | 8/2017 | Han | G11B 27/10 |
| 2018/0161682 A1* | 6/2018 | Myhill | H04N 21/8173 |

* cited by examiner

REMOTE VIDEO TRIGGERING AND TAGGING

RELATED APPLICATIONS

This application is a continuation patent application of U.S. patent application Ser. No. 17/243,855, filed Apr. 29, 2021, which is a continuation patent application of U.S. patent application Ser. No. 16/534,761, filed Aug. 7, 2019, now U.S. Pat. No. 11,024,137, issued Jun. 1, 2021, which claims priority to U.S. Provisional Patent Application No. 62/716,277 filed on Aug. 8, 2018, and U.S. Provisional Patent Application No. 62/836,913 filed on Apr. 22, 2019, the disclosures of which are incorporated herein by reference.

Embodiments and/or features of the invention described in the present document may be used with the subject matter disclosed in commonly assigned U.S. Pat. No. 8,781,292, filed Sep. 27, 2013, issued Jul. 15, 2014 and entitled "COMPUTER PROGRAM, METHOD, AND SYSTEM FOR MANAGING MULTIPLE DATA RECORDING DEVICES" ("the '292 patent"); and commonly assigned U.S. Pat. No. 9,253,452, filed Aug. 14, 2013, issued Feb. 2, 2016, and entitled "COMPUTER PROGRAM, METHOD, AND SYSTEM FOR MANAGING MULTIPLE DATA RECORDING DEVICES" ("the '452 patent"). The '292 patent and the '452 patent are hereby incorporated by reference in their entirety into the present application.

BACKGROUND

1. Field

Embodiments of the invention are broadly directed to video collection and storage. More specifically, embodiments of the invention are directed to the collection and sending of metadata related to video data from video cameras to a remote video collection manager via a mobile broadband network.

2. Related Art

The transmission of video data is burdensome on bandwidth and memory resources. Similarly, the backend processing of video data is processor intensive, requiring the processor to analyze, tag, and extract certain portions of the video data. For large systems of video camera (such as a law enforcement fleet, school, or hospital, as examples) this transmission and processing can cause significant delays or be prohibitive in most instances. For example, most law enforcement agencies transfer video files from a law enforcement vehicle to a back office using a standard Wi-Fi connection. This process is adequate for small files and uncongested Wi-Fi networks. However, for large files (such as those created with high-definition cameras) and multiple camera systems, Wi-Fi is slow and unreliable. Thus, many law enforcement agencies began having the law enforcement office physically transferring a memory card to the back office, but in this there is a chance of losing the data and requires the law enforcement officer to remember to bring and return the memory card.

What is lacking in the prior art is an efficient and intelligent system to manage video transmission and processing from video cameras. An administrator with information about the video data recorded, and remotely instructing the recordings, can more specifically request video data from the video camera. This will reduce transfer time and back-end processing time.

SUMMARY

Embodiments of the invention solve these problems by providing a video collection system collects and sends metadata related to video data such that recording may be triggered and tagged. The video collection system utilizes a mobile broadband network (such as a cellular network) to send metadata, receive triggers, and perform other functions while the video collection system is in the field. The video collection system broadly comprises a plurality of video cameras and a video collection manager. The video cameras each include a mobile broadband modem or other wireless communication element for sending metadata messages. In some embodiments the mobile broadband modem may also send still images, audio data, and video data in certain circumstances as discussed below. The video camera may also be associated with a video dock for the transfer of video data to the video collection manager. The video collection manager is communicatively coupled with one or both of the plurality of cameras and the plurality of camera docks. In some embodiments, the camera can be instructed or controlled by the video collection manager and can transmit captured metadata, such as to a memory associated with the video collection manager. The video collection manager can transmit trigger information, tag information, and other information that will expedite the later processing and transfer of video data. The captured video is transmitted or otherwise downloaded to the camera dock, and the video collection manager can instruct or otherwise control transmission of the captured video from the video camera dock and to the memory associated with the video collection manager.

A first embodiment of the invention is broadly directed to a video camera comprising a lens assembly, a non-volatile memory, a mobile broadband modem, and a processor. The processor is configured to receive, from a remote video collection manager via the mobile broadband modem, a trigger message indicative of a triggering event remote from the video camera. The processor is further configured to instruct video data from the lens assembly to be stored in the non-volatile memory in response to the trigger message. The processor is further configured to send, to the remote video collection manager via the mobile broadband modem, a metadata message indicative of the video data from the lens assembly. The processor is further configured to receive, from the remote video collection manager via the mobile broadband modem, a trigger termination message based at least in part of the metadata message. The processor is further configured to send, to the remote video collection manager via the mobile broadband modem, a post-recording metadata message. The processor is further configured to cease storage of the video data in the non-volatile memory.

A second embodiment of the invention is broadly directed to a computerized method of capturing video data by a video camera, the computerized method comprising: receiving, by a mobile broadband modem of the video camera, an administrator-initiated trigger via a mobile broadband network; initiating a recording of video data; sending, to a video collection manager via the mobile broadband modem, a metadata message indicative of metadata associated with the video data; terminating the recording of the video data in response to termination of the administrator-initiated trigger; sending, to the video collection manager via the mobile broadband modem, a trigger-complete metadata message; and storing the video data for later transfer.

A third embodiment of the invention is broadly directed to a video collection system comprising a video camera and a video collection manager. The video camera includes a mobile broadband modem. The video collection manager is communicatively coupled to the video camera via the mobile broadband modem of the video camera. The video collection manager is configured to send a first triggering message to the video camera indicative of an administrator-initiated trigger. The video camera is configured to record a first set of video data based upon the first triggering message. The video collection manager is configured to receive a second triggering message from the video camera indicative of a user-initiated trigger. The video camera tags a second set of video data based upon the second triggering message. The video collection manager is configured to receive a periodic metadata message from the video camera indicative of video data being recorded by the video camera.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the invention will be apparent from the following detailed description of the embodiments and the accompanying drawing figures.

BRIEF DESCRIPTION OF THE DRAWING FIGURES

Embodiments of the invention are described in detail below with reference to the attached drawing figures, wherein.

Figure 1:
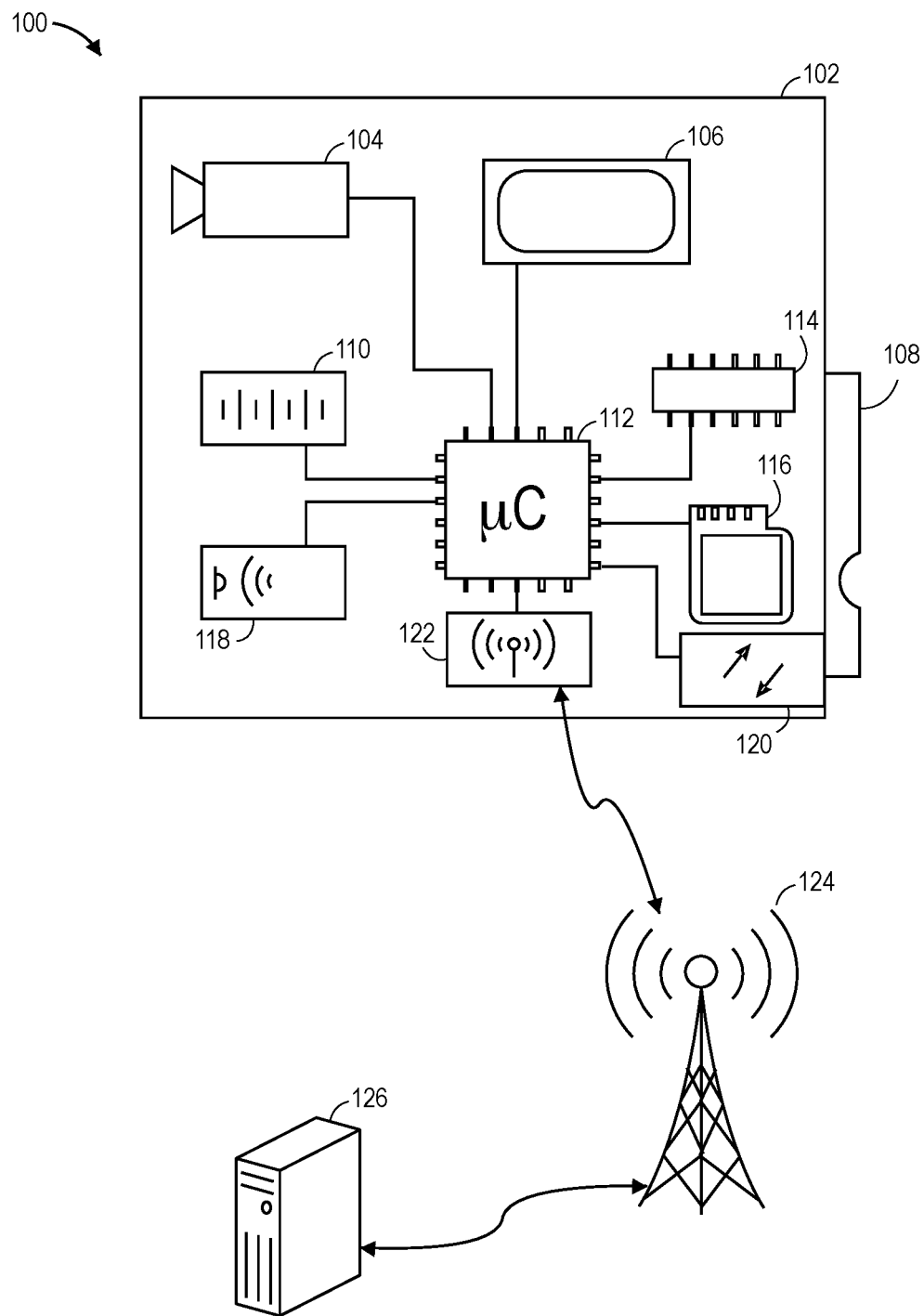
FIG. 1 is a schematic diagram illustrating internal components of a video camera configured to communicate with a remote video collection manager via a mobile broadband network.

The drawing figures do not limit the invention to the specific embodiments disclosed and described herein. The drawings are not necessarily to scale, emphasis instead being placed upon clearly illustrating the principles of the invention.

DETAILED DESCRIPTION

The following description of the invention references the accompanying drawings that illustrate specific embodiments in which the invention can be practiced. The embodiments are intended to describe aspects of the invention in sufficient detail to enable those skilled in the art to practice the invention. Other embodiments can be utilized, and changes can be made without departing from the scope of the invention. The following detailed description is, therefore, not to be taken in a limiting sense.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current technology can include a variety of combinations and/or integrations of the embodiments described herein.

Embodiments of the invention may be embodied as, among other subject matter, a method, a system, or a set of instructions embodied on one or more computer-readable media. Computer-readable media include both volatile and nonvolatile media, removable and nonremovable media, and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer-readable media" should not be construed to include physical, but transitory, forms of signal transmission such as radio broadcasts, electrical signals through a wire, or light pulses through a fiber-optic cable. Examples of stored information include computer-useable instructions, data structures, program modules, and other data representations.

Different forms of computer-readable media store data in different ways. For example, volatile storage media such as RAM may retain data only as long as it is powered, while non-volatile media such as flash memory retain data even when powered off. Furthermore, some forms of computer storage media are write-once, read many (WORM), such that data can be stored to them but not erased or overwritten. For some forms of WORM media, data can be recorded in multiple sessions, where the data from one session is appended to the data from the previous session. Other forms of media may be indefinitely rewriteable. Some forms of media may be encrypted, such that data is written to them encrypted by an encryption key (which can correspond to the device, the user, or be unique in some other way) and data read from them is scrambled unless decrypted with the corresponding decryption key.

Additionally, storage media can be made tamper-resistant such that it is difficult or impossible to alter or erase data stored to them, or to prevent reading data except by authorized means. WORM media or encrypted media, as described above are one way to make storage media tamper resistant. Another way is to make storage media physically difficult to remove, such as by covering them with epoxy after they have been installed. Other methods of making storage resistant tamper resistant are also known in the art and can be used.

Turning first to FIG. 1, a system diagram showing a video camera 100 is depicted schematically. The video camera 100 generally comprises a camera housing 102 and various internal components. The camera housing 102 may take any of numerous form factors, such as those shown in FIG. 2 and discussed below. For example, the camera housing 102 may be mounted on a person (either directly or via clothing or some other equipment), in a vehicle oriented outward, in a vehicle oriented inward, on a static structure, a head-mounted display form factor incorporating an eyepiece, a low profile, lapel- or epaulet-mounted form factor, or other form factor.

Mounted inside the camera housing 102 is at least one lens assembly 104. The lens assembly 104 is configured to capture video data. In some embodiments, additional lens assemblies may also be present. Each of lens assembly 104 is operable to provide a video feed of video data. While reference is made to "video data" and "video feeds," In some embodiments, lens assemblies 104 may instead, or in addition, record still image data.

In certain embodiments, camera housing 102 may also include a display 106. In some embodiments, display 106 may be a monocular display for displaying the video feed from lens assembly 104, replaying recorded video data, or displaying other information. The other information may include metadata associated with the video data. In other embodiments, the display 106 is a glassless holographic display. Where present, display 106 generally may be any form of image display technology now known or hereafter discovered or invented. In some embodiments, display 106 is not integrated into camera housing 102, but rather removably attached, either directly or via a cable or wireless connection.

In some embodiments, camera housing 102 will also have an attachment structure 108 for connecting to one of a variety of suitable mounts. This attachment structure 108 may be purely mechanical or may incorporate data connections for connection to display 106, and/or other peripheral units. Examples of such attachment structures 108 include screw mounts, clip mounts, ball-and-socket mounts, friction mounts, and snap mounts. Any type of mounting hardware, now known or hereafter discovered may be used. The attachment structure 108 may be configured to be secured to a person, a vehicle, a stand, or other equipment.

In some embodiments, power supply 110 is mounted in camera housing 102. In some embodiments, power supply 110 is a set of rechargeable battery cells. These cells can be removable for recharging or chargeable via an external connection. In other embodiments, power supply is one or more non-rechargeable batteries. In still other embodiments, power supply 110 is a fuel cell or micro-turbine. Any form of power supply, now known or hereafter invented may be used as power supply 110.

Figure 3:
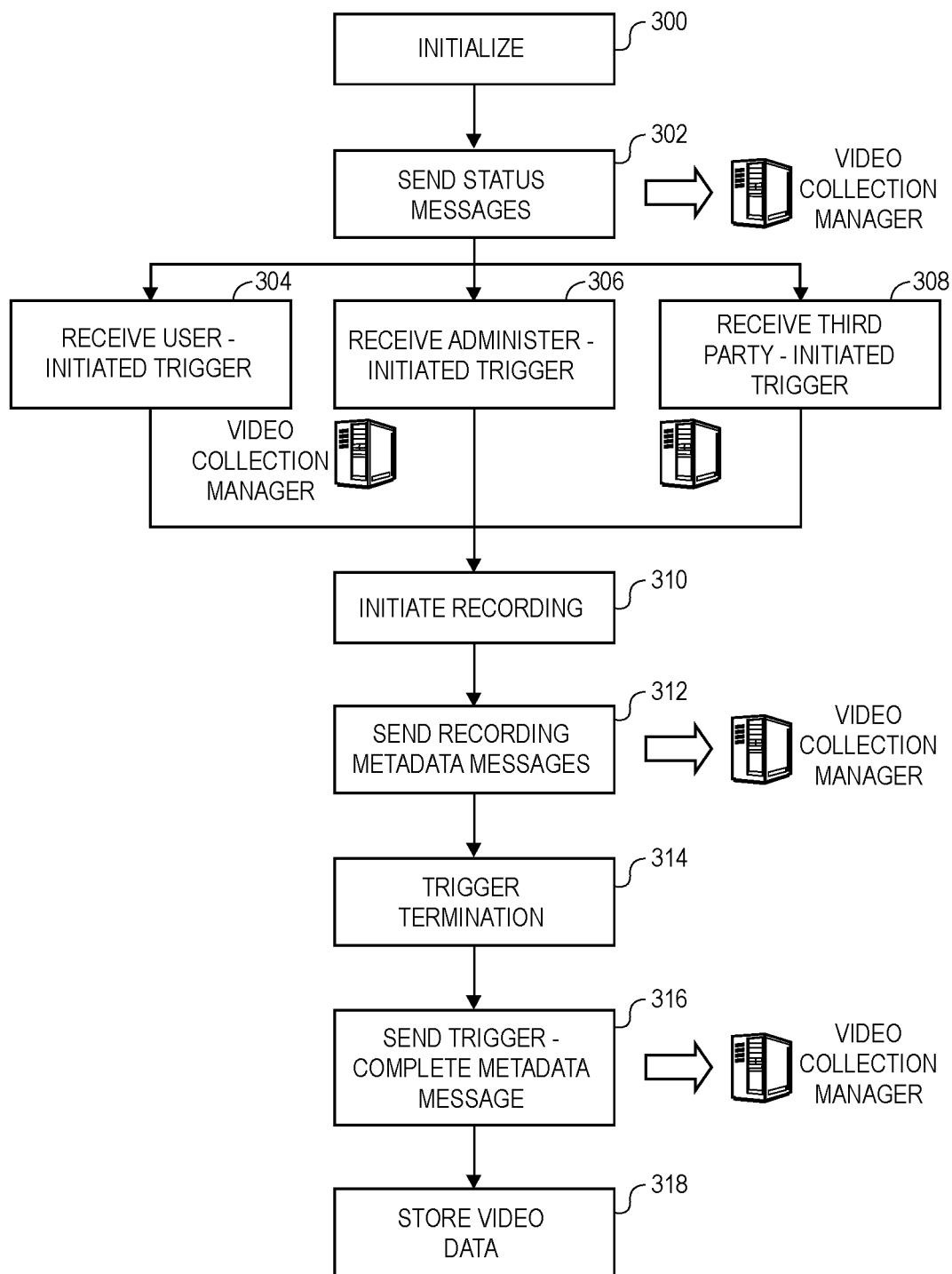
FIG. 3 is flow diagram illustrating exemplary steps performed by the video camera.

In some embodiments, the camera housing 102 also contains processor 112 and associated controller circuitry. In various embodiments, processor 112 performs different functions associated with the operation of the camera unit including video encoding, trigger event detection, storage management, and input/output (I/O) control, as well as other functions known in the art. Processor 112 may take the form of a microcontroller, microprocessor, or special-purpose controller circuitry. Processor 112 may also incorporate one or more computer-readable media for storing device firmware. Processor 112 is electrically coupled to power source 110, and communicatively coupled to lens assembly 104 as well as various components installed in camera housing 102, including storage memories such as volatile memory 114 and non-volatile memory 116, sensors such as sensor 118, and I/O ports and controllers such as I/O unit 126. One exemplary method of operation for processor 112 is depicted in FIG. 3.

Encoded video data and other data processed by processor 112 may be stored in one or more memories such as volatile memory 114 or non-volatile memory 116. In one embodiment, video is recorded continuously, along with any relevant metadata, and stored in volatile memory 114. When a triggering event occurs (either locally, or received as a message from a remote device, as discussed in depth below), the contents of volatile memory 114 are transferred to non-volatile memory 116, and incoming video is also stored in non-volatile memory 116. In other embodiments, two non-volatile or volatile memories are used. In yet other embodiments, a single memory is used. In some single-memory embodiments, all video data is stored to non-volatile memory 116. In other single-memory embodiments, a triggering event initiated the recording and storage of data. In some embodiments, non-volatile memory 116, volatile memory 114, or both provide authenticated, tamper-resistant storage such that recorded data can be used as evidence in legal proceedings. In some embodiments, processor 112 uses a device-specific key to digitally sign or otherwise authenticate video recordings. In some embodiments, non-volatile memory 116 is a removable memory card. In some such embodiments, non-volatile memory 116 is write-once, read-many (WORM) memory. In general, the storage memories used in embodiments of the invention can be any data storage media known in the art as described herein or invented in the future. In some embodiments, camera housing 102 has no persistent storage memory, and video data that is to be retained is transmitted in real time over a network to a remote data store. In other embodiments, data to be retained is both stored locally and transmitted to a remote data store.

In some embodiments, additional sensors such as sensor 118 are present in camera housing 102, or elsewhere. Such sensors 118 may provide data to supplement the video data provided by lens assembly 104. Examples of such sensors include a microphone for recording audio data, a radio receiver for recording radio transmissions, a global-positioning system (GPS) receiver for recording position data, one or more accelerometers for recording movement and acceleration data, and a radio-frequency identifier (RFID) receiver for recording the presence of nearby RFID tags.

In some embodiments, the camera housing 102 may also contain an input/output ("I/O") unit 120. The I/O unit 120 may allow additional modules such as those containing additional sensors to be attached. In some embodiments, I/O unit 120 allows data from storage memories 114 and 116 to be transferred off of the device. In other embodiments, it allows processor 112 to be reprogrammed. In yet other embodiments, it allows power supply 110 to be recharged. It will be apparent to a person skilled in the art that I/O unit 120 may perform all of these functions, individually or in parallel. For example, the video camera 100 may be inserted into a camera dock (not illustrated) for recharging and transfer of video data.

In some embodiments, the video camera 100 comprises a mobile broadband modem 122. A mobile broadband modem 122 is a type of modem that allows the video camera 100 to receive Internet access via a mobile broadband connection. The video camera 100 includes a mobile broadband modem 122 or is otherwise communicatively coupled with a mobile broadband modem 122. The video camera 100, via the mobile broadband modem 122, sends status messages (which may be periodic, based upon a user-initiated trigger, or both) and receives status messages and instructions (which may be periodic, based upon an administrator-initiated trigger, a third-party-initiated trigger, or some combination thereof).

The mobile broadband modem 122 communicates with a mobile broadband network 124. In embodiments, the mobile broadband network 124 is a cellular network. Examples of cellular networks include Code Division Multiple Access ("CDMA"), Global System for Mobile communications ("GSM"), Orthogonal Frequency-Division Multiplexing ("OFDM"), variations thereof, and other cellular networks.

The mobile broadband network 124 may use any of various data transmission protocols, presently existing or hereafter invented. Examples of data transmission protocols include 2G, 3G, 4G, 4G LTE, and 5G.

A video collection manager 126 is communicatively coupled with the mobile broadband network 124. The video collection manager 126 is a centralized or regional device or computer program, such as a cloud-based storage system. The video collection manager 126 communicates with the video cameras to determine what video data is being recorded, trigger the recording and saving of certain video data, instruct tags to be added to the video data for later retrieval and transfer, and other functions. The video collection manager 126 may also track the location of the video camera 100, the status of the video camera 100, and other information based upon periodic metadata messages sent from the video camera.

The mobile broadband network 124 is connected to the Internet as discussed above. Thus, the video collection manager 126 may be connected via the Internet or via the mobile broadband network 124 directly. For example, the video collection manager 126 may also include a mobile broadband modem. As another example, the video collection manager 126 may include a wired Internet connection. The video collection manager 126 may be a server, a cloud-based computing device, a cloud-based storage system, a computing device at a headquarters or dispatch location, or other computing device.

Figure 2:
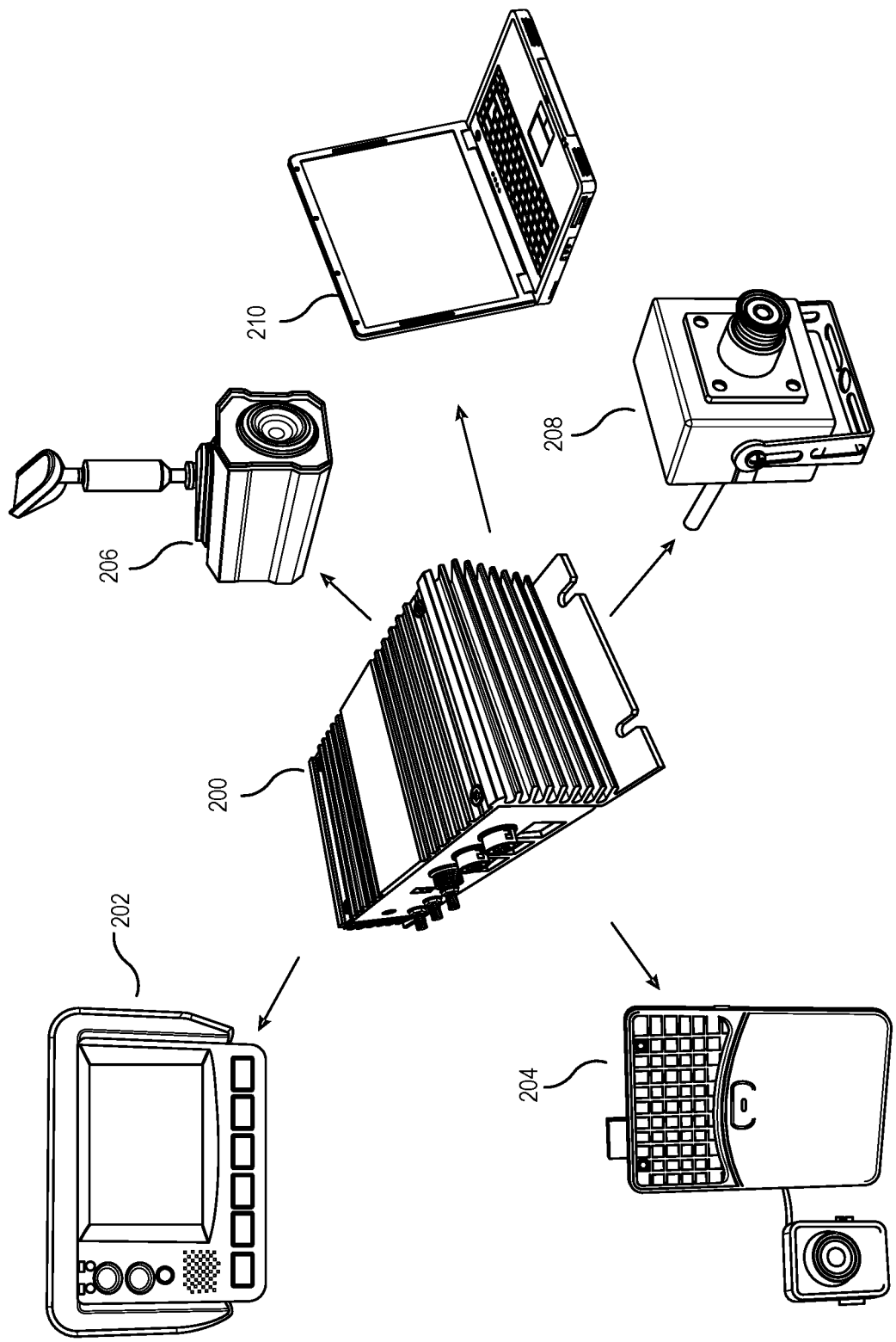
FIG. 2 is a schematic diagram illustrating a video collection system of which the video camera may be a component.

Turning to FIG. 2, an exemplary video collection system is shown. Broadly, the video collection system includes a recording device manager 200 and one or more component devices. Some embodiments of the invention include a recording device manager 200 as described in commonly-assigned U.S. Pat. Nos. 8,781,292 and 9,253,452, both of which are incorporated herein in their entireties. The recording device manager 200 may receive an indication that one video camera 100 has begun recording and instruct other video cameras (or other recording devices) to also begin recording. The recording device manager 200 may include a user control device 202 that allows the user to view, edit, save, and organize the video data.

As shown in FIG. 2, the video collection system may include a person-mounted video camera 204, a vehicle-mounted video camera 206, or a static-mounted video camera 208, other video cameras, or some combination thereof. The video camera 100, discussed herein, may be the person-mounted video camera 204, the vehicle-mounted video camera 206, or the static-mounted video camera 208, or some other video camera. The video camera 100,204,206, 208 records video data and/or audio data. The video camera includes a mobile broadband modem 122 or is otherwise communicatively coupled with a mobile broadband modem 122. For example, the mobile broadband modem 122 may be within (or otherwise associated with) the recording device manager 200, such that the messages described below are sent with the recording device manager 200 as a conduit thereto. The video camera 100, via the mobile broadband modem 122, sends status messages (which may be periodic, based upon a user-initiated trigger, or both) to the video collection manager 126 and receives status messages and instructions from the video collection manager 126 (which may be periodic, based upon an administrator-initiated trigger, a third-party-initiated trigger, or some combination thereof).

The video collection system may include a computer 210 or other external storage device. The video camera 100 may also send video data to the computer 210 or other video cameras, memory cards, external memory, or a back-end office. For example, a vehicle-mounted video camera 206 may transfer a portion of captured video data to a body-mounted video camera so as to expedite the upload of the captured video data when the body-mounted video camera is docked for recharging (instead of relying of the physical transfer of a memory card or the upload over Wi-Fi, as discussed above).

Turning to FIG. 3, exemplary steps performed by the video camera 100 are shown and described. As shown in FIG. 3, various communications to and from the video collection manager 126 are shown. These communications are made by the mobile broadband modem 122 via the mobile broadband network, as discussed above.

In Step 300, the video camera 100 initializes. The video camera 100 initializes upon power up or other initialization. Alternatively power up may be through an independent power cable from an external power source (such as an automobile electrical system). In other embodiments, power up may be initiated by the user pressing (or otherwise manipulating) a button or other power switch (not illustrated) on the video camera 100. In these embodiments, the video camera 100 may be powered by an internal battery (e.g., power supply 110). Upon initializing, based upon receiving power or an initialization instruction as discussed above, the video camera 100 performs boot up functions and other initialization functions. These may include communication with external computing devices, interfacing with sensor, beginning internal processes, powering up internal devices such as the display 106, checking for internal errors, and other initialization processes.

In Step 302, the video camera 100 sends a status message to the video collection manager 126. The status message informs the video collection manager 126 of the availability of the video camera 100 to begin recording if needed. The status message may also include other information related to the video camera 100, as discussed below in relation to FIG. 4.

In Steps 304, 306, and/or 308, triggers are received by the video camera 100 from various sources. Triggers instruct a recording to begin, a recording to be saved, a recording to be tagged or marked (or otherwise have certain metadata associated with it), or some combination thereof. Triggers may additionally, or alternatively, or in certain instances, be indicative that such an action has already been taken and are thus a status update. Three exemplary types of triggers, as mentioned above, include user-initiated triggers, administrator-initiated triggers, and third-party-initiated triggers. These are discussed in more depth below. Other types of triggers may also be used. Further, multiple different types of triggers may be received subsequently and/or other different occasions. For example, a first trigger received may be an administrator-initiated trigger and a second trigger received may be a third-party initiated trigger. The second trigger may be initiated during or after the first trigger. Thus, multiple triggers may be active simultaneously.

In Step 304, the video camera 100 receives a user-initiated trigger. A user-initiated trigger originates from the user or video camera 100 itself. The user-initiated trigger may be manually created or automatically created. Manually created triggers may be generated by the pressing of a button, a selection of a user input, a powering-on of the video camera 100, or other action by the user. For example, the user may press a button (such as a trigger button or a begin-recording button) on the video camera 100 to initiate a trigger. The trigger may be automatically created upon the detection of a certain criteria (which may be known as a triggering event). Examples of a triggering event can include detection of the sound of a gunshot or other loud noise, detection that sirens have been activated, entering or leaving of a certain geographic area, detection of the drawing of a firearm or electronic weapon, detection of the beginning of a breath analysis or other external device use, detection of a vehicular collision or other driving event, detection of an elevated heart-rate or step-rate by the user, detection of a certain speed or orientation of the video camera 100 (or a rate of change thereof), or the detection of some other criteria that may be indicative that the video data collected may be of potential future relevance. Yet another automatic user-initiated trigger could be the loss of communication with the video collection manager 126. The video camera 100 will be sending the below-discussed periodic metadata messages via the mobile broadband modem 122 or other wireless communication element. If an acknowledgement is not received from the video collection manager 126, a recording or tagging could be triggered by the lack of an acknowledgement (or after a couple of attempts). For example, if the user went out of transmission range such as in a building, basement, or other, the video camera 100 would ultimately be triggered to record or otherwise tag the video data. It should be appreciated that in some instances the user-initiated trigger is produced locally (e.g., on the actual video camera) and in some instances the user-initiated trigger is produced via the mobile broadband modem 122 or other type of I/O unit.

In Step 306, the video camera 100 receives an administrator-initiated trigger. Administrator-initiated triggers originate from a system administrator, dispatcher, supervisor, or other person that is remote from the video camera 100 and associated with the system (and/or the entity utilizing the system), or from the system itself. As above, the administrator-initiated trigger may be manually created or automatically created. The administrator may manually create the trigger by instructing the video collection manager 126 to send a trigger to all or some of the video cameras. As an example, the administrator monitoring a situation may trigger all video cameras in a certain geographic area such that all begin recording and/or tag the already recording data. As another example, if the dispatcher knows that a user is in a situation which should trigger the video camera 100, but the user has forgotten to initiate, the administrator can initiate the trigger remotely. The video collection manager 126 may automatically create the trigger based upon the occurrence of certain conditions. For example, if the video collection manager 126 receives a user-initiated trigger from a first video camera, the video collection manager 126 may automatically generate a trigger for a second video camera that is in proximity to the first video camera (or which may come into proximity at a later time).

In Step 308, the video camera 100 receives a third-party initiated trigger. Third-party-initiated triggers originate external to the system. In some embodiments, the third-party-initiated trigger may be generated externally to the system and sent to the system as a trigger. In other embodiments, the third-party-initiated trigger may be generated by the system in response to external information. For example, the trigger may be generated based upon information from a weather service (such as the National Weather Service), an earthquake detection system, an alerting system (such as an Amber Alert, a Silver Alert, a National Emergency Alert), or other system. The third-party may also be a similar system that is outside the control of the system. For example, a system that operates a city's fire department video system may generate third-party-initiated triggers for a separate but similar system that operates that city's police department video system. In some embodiments, the third-party-initiated trigger may be received and distributed by the video collection manager 126. In other embodiments, the third-party-initiated trigger may be sent to the video camera 100 directly from the external source.

In Step 310, the video camera 100 initiates recording based upon one or more of the above-discussed triggers. As discussed above, video data will be stored in the non-volatile memory 116 of the video camera 100, such that all or a portion of the video data may be subsequently transferred. The video camera 100 is used to record events as seen from a first-person perspective of the wearer, the vehicle in which the camera is mounted, the permanent mounted location of the camera, or other location. This can be advantageous for recreating and demonstrating what happened at a later date. For example, if the wearer observes a crime, an accident, or an event or function being performed, this can be observed later by others via the video. Because the indication that such an event needs to be recorded may come from the user, the administrator, or some third party, the triggering of the video recording, saving, and/or tagging may be originating from different entities. As such, in embodiments of the invention, the video camera 100 is configured to send triggering indications, receive triggering indications, send periodic metadata messages, and perform other functions relative to the video collection manager 126.

In embodiments of the invention, the video camera 100 will record continuously throughout the work shift (or similar time period). The video camera 100 may contain enough battery life in power supply 110 and enough memory in a camera-memory unit to record at least one day's worth of events. The wearer can utilize a "mark" button on the video camera 100 to denote important events or observations that may be worthy of later review and retention. The wearer may also perform an audible tagging by saying a certain phrase that is interpreted as being a mark, such that the wearer need not push a mark button. The audible tagging may also be automatic, such as by being triggered by very loud noises captured. The video data captured by the video camera 100 may be stored internally and/or transferred to the camera dock as discussed below. The video data may then be selectively stored and/or transferred based upon the tags in the video data, a retention policy of the system, a "first in, first out" ("FIFO") buffer, or other criteria. These functions may be performed in addition to the sending and receiving of metadata messages, triggers, and other information about the video data.

Other examples of parameters associated with the camera that may be used to determine recording, tagging, and/or post-proceeding deletion of recorded data include a time of day when the data is being recorded, the user and privileges associated with the user, a memory capacity of a particular camera, a type of or location of the video camera 100 (e.g., a head-mounted camera may be assigned different recording and processing features than a vehicle-mounted camera), etc.

In Step 312, the video camera 100 sends periodic metadata messages to the video collection manager 126. The video camera 100 may send the periodic metadata messages directly to the video collection manager 126, via the mobile broadband modem 122 (or other wireless communication element) or indirectly to the video collection manager 126, via the mobile broadband modem 122 and a recording device manager 200 or other device. The wireless communication element may be a mobile broadband modem 122 (as discussed above), a Wi-Fi transceiver, a Bluetooth transceiver, or other structure configured to communicate wirelessly.

The mobile broadband modem 122 allows the video camera 100 to remain in communicative contact with the video collection manager 126 as the video camera 100 travels. Because mobile broadband connections are more extensively available in most areas, this allows the video camera 100 to remain in communicative contact over a large area. This allows the video camera 100 to send status messages, metadata messages, trigger messages, and other information. This also allows the video camera 100 to receive status messages, metadata messages, trigger messages, and other information from the video collection manager 126. Further, this allows the video collection manager 126 to track the locations and recording statuses of various video cameras, and to instruct recording and/or tagging based upon a trigger.

Various types of metadata may be associated with the video data. Metadata may provide information related to how the recording started, who started the recording, how the recording stopped, who stopped the recording, etc. Broadly, metadata may include beginning of the recording metadata (such as user information, who started the recording, how the recording started, a timestamp for the beginning of the recording, a location stamp for the beginning of the recording, an event identifier received or generated, a status of the hardware, trigger information, external associated camera information, etc.), ongoing metadata during the recording (such as speed during the recording, location during the recording, orientation of the video camera 100 during recording, and other information), end of the recording metadata (such as how the recording stopped, who stopped the recording, a time stamp for the end of the recording, a location stamp for the end of the recording, whether the recording ended due to loss of power), and post-recording metadata added manually by the user and/or the administrator.

Examples of metadata broadly include header metadata, internal event triggering metadata, external event triggering metadata, frame header metadata, frame metadata, GPS location metadata, streaming metadata, camera monitoring metadata, checksum metadata, microphone metadata, recording ended metadata, event profiling metadata, Bluetooth metadata, output trigger metadata, dock metadata, video collection manager metadata, and system health metadata. It should be noted that the above are example groupings or types of metadata and that other groupings or types may be used. Examples of these groupings or types are discussed in more depth below.

As a first example, header metadata may include a device firmware version, a metadata format version, a device serial number, a device type, a vehicle identification number associated with the device, a user number, a user name, a date stamp, a time stamp, an event identification number, an event name, an event description, an incident or case number, a video stream count, an audio stream count, and the like.

As a second example, internal event triggering may include acceleration data, speed data, braking data, cornering data, collision data, GPS location data, button press on device data, button press on a remote data, power loss data, vertical threshold data, event continuation data. As a third example, external event triggering may include any number of external sensors that may be providing data.

As a fourth example, frame header metadata may include frame identifiers, offset, frame type, data length, and other data information. As a fifth example, frame metadata may include vehicle speed, GPS latitude, GPS longitude, GPS valid or not, number of GPS satellites, distance from home base, distance from some other location, patrol, lock, target, accelerometer readings, and external sensor readings. As a sixth example, GPS location metadata may include any of numerous unauthorized location information such that the proximity to those unauthorized locations may be determined. Similarly, the GPS location metadata may include waypoints, dispatch locations, headquarters locations, locations of interest, and other locations.

As a seventh example, the streaming metadata may include stream number, video source, audio source, left audio source, right audio source, day/night mode, camera type, zoom level, flags, bitrate, video active, video monitored, lights, IR lights, covert mode, and camera numbers.

As an eighth example, the checksum metadata may include a file name, a hash type, and the checksum itself. As a ninth example, the microphone metadata may include a serial number of the microphone, a GPS location of the microphone, a stream number, a status, and an audio feed status. As a tenth example, the recording ended metadata may include an end time stamp, an end date stamp, a method of ending (such as stop button, post event, file size limit, video signal lost, power off by user, low battery power off, external command, etc.).

As an eleventh example, the event profiling metadata may include information related to a subject of the video (such as age, gender, ethnicity, and other distinguishing characteristics) and may include a reference or identification number for the subject. As a twelfth example, the Bluetooth metadata may include information related to Bluetooth activation and/or deactivation, Bluetooth connection status, Bluetooth signal strength, Bluetooth connection established timestamp, Bluetooth connection lost timestamp, and other information related to a Bluetooth connection. As a thirteenth example, the dock metadata may include information related to a dock into which the camera was placed after the recording was completed. The dock metadata may include a dock type, a dock serial number, a dock firmware version, a user name associated with the dock, a docking timestamp, etc. The video collection manager metadata may include video collection manager type, a video collection manager serial number, a video collection manager firmware version, a vehicle and/or user associated with the video collection manager, an event identifier supplied by the video collection manage, an offset time, a record of the instruction to begin recording, a record of the instruction to end recording, a status update from the video collection manage, and other information related to the video collection manager 126.

As a fourteenth example, the system health metadata may be independent of any particular video event. System health metadata is a record of system operations, statuses, and other information. The system health metadata is recorded in a log file that can be used to determine the cause of a system failure.

Because at least a portion of the metadata is being sent to the video collection manager 126 via the mobile broadband network 124, the administrator can be alerted to various conditions and take action accordingly. For example, if the user manually stopped the recording, the administrator may reinstate the recording and/or lock the user out of ending the recording. As another example, the recording may stop only upon the administrator approving the stopping of the recording. As still another example, the administrator may create a geofence or other location information remotely that affects the operation of the camera in relation to that location (e.g., no users may manually stop recording within 200 yards of the designated location).

In Step 314, the trigger terminates. The trigger my terminate in any of numerous ways. For example, the user may terminate the trigger, such as by pressing the mark button again or providing another user input. As another example, the administrator may terminate the trigger based upon a resolution of the situation that caused the trigger to be initiated. As yet another example, the trigger may be terminated upon the passage of a certain period of time, the movement of the video camera 100 into or out of a certain location, an audible cue by the user, the removal or ending of the condition that initiated the trigger, or other information.

In Step 316, the video camera 100 sends a trigger-complete metadata message to the video collection manager 126. The trigger-complete metadata message may be indicative that the trigger complete message was received, the video camera 100 is complying with the trigger complete message, that the video recording has ceased, that the trigger was completed locally by the user, or other indication. The trigger-complete metadata message may be a periodic metadata message. Further, the trigger-complete metadata message may include metadata regarding the recording that is available upon completion.

In Step 318, the video camera 100 stores the video data. This may include recording the video data in the non-volatile memory 116, transferring the video data (or a portion thereof) via the I/O port or the mobile broadband modem 122, transferring the video data (or a portion thereof) to the computer 210 or to another external computing device.

Figure 4:
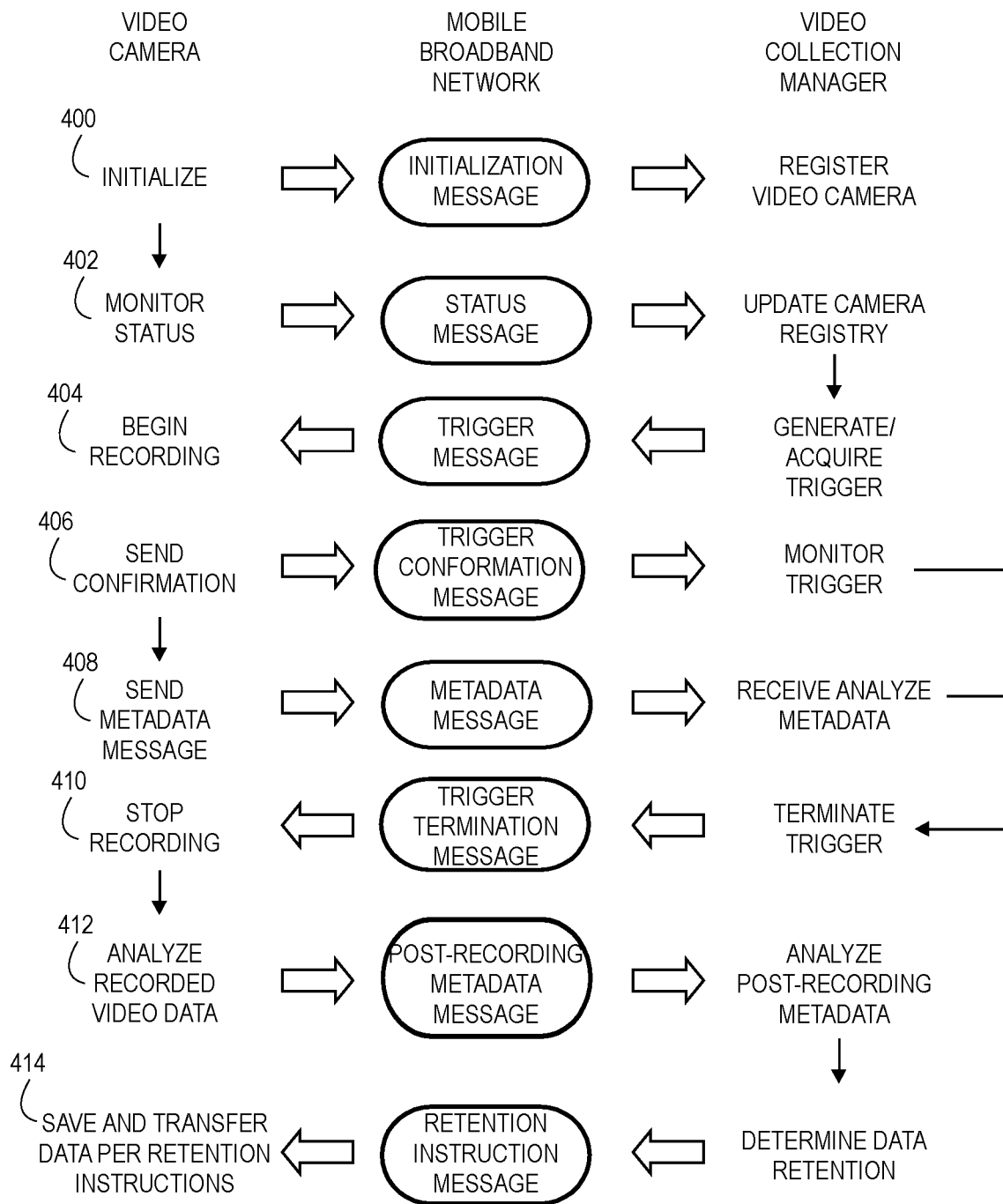
FIG. 4 is a flow diagram illustrating exemplary messages that may pass between the video camera and the video collection manager via the mobile broadband network.

Turning to FIG. 4, various messages via the mobile broadband network 124 between the video camera 100 and the video collection manager 126 are shown. It should be appreciated that, as with other steps discussed herein, the steps described herein are not necessarily in order: not all steps need be performed in all embodiments, steps may be performed in any order, some steps may be performed simultaneously, some steps may be performed more than once, etc.

In Step 400, the video camera 100 and the video collection manager 126 establish wireless electronic communication via the mobile broadband modem 122. The video collection manager 126 receives and processes information from the video camera 100 upon the connection being established. This allows for secure and automatic transfers of information. If the connection is lost, or if the transfer is interrupted, the information may be saved at the video camera 100 and transferred upon a reconnection. The files transferred may also be logged for a complete audit trail.

In Step 402, the video camera 100 sends a first status message to the video collection manager 126 via the mobile broadband modem 122. For example, the first status message may include location, speed, orientation, recording status, trigger status (whether any trigger has been received or is otherwise active), associated user information, associated device information, and other status information. The video camera 100 sends a second status message, and other subsequent status messages. In some instances, the second or subsequent status message may include information that has changed since the previous status message. For example, if the location and speed have changed since the previous status message, this information will be sent while other information that has not changed, such as associated device information, may not be sent or may be abbreviated. The second or subsequent status message may be delayed from the first status message by a certain time interval (such as ten seconds, thirty seconds, one minute, ninety seconds, two minutes, or other interval), or by a change in the information sent, or both.

In Step 404, a trigger indication is generated. As discussed above, the trigger indication may be initiated at the user, an administrator (such as the video collection manager 126 itself), or a third party. The trigger indication is sent from the generating device to the other device (e.g., from the video camera 100 to the video collection manager 126, or from the video collection manager 126 to the video camera 100). The trigger indication therefore ensures that both devices have information that a trigger has been or should be initiated.

In Step 406, a trigger confirmation message is sent by the video camera 100 to the video collection manager 126. The trigger confirmation message may indicate receipt of the trigger message, the beginning of recording of video data, the storing of the recording of video data, the annotation of otherwise recorded video data, or some other indication to the video collection manager 126 that the video camera 100 is complying with the trigger message. The video camera 100 may also send periodic trigger confirmation messages indicative that the video camera 100 considers the trigger to still be active. This allows the video collection manager 126 to terminate the trigger at a certain time (or upon some other criteria).

In Step 408, periodic metadata messages are sent to the video collection manager 126 during the trigger. This allows the video collection manager 126 to continue to track the location, recording status, and other status information for the video camera 100. The periodic metadata messages may include any combination of header metadata, internal event triggering metadata, external event triggering metadata, frame header metadata, frame metadata, GPS location metadata, streaming metadata, camera monitoring metadata, checksum metadata, microphone metadata, recording ended metadata, event profiling metadata, Bluetooth metadata, output trigger metadata, dock metadata, video collection manager metadata, and system health metadata (as discussed above).

In Step 410, a trigger termination message is sent from the video collection manager 126 to the video camera 100 via the mobile broadband network 124. As discussed above, the trigger may be terminated in any of numerous ways. For example, the administrator may terminate the trigger based upon a resolution of the situation that caused the trigger to be initiated. As yet another example, the trigger may be terminated upon the passage of a certain period of time, the movement of the video camera 100 into or out of a certain location, an audible cue by the user, the removal or ending of the condition that initiated the trigger, or other information.

In Step 412, a trigger-complete metadata message may be sent to the video collection manager 126. The trigger-complete metadata message may include a checksum and other information about the video data, such as the length of the recording, locations associated, and other information. The trigger-complete metadata message may be utilized by the video collection manager 126 to determine what video data to request from the camera dock or directly from the video camera 100. In this way, the video collection manager 126 generates a list of what video data was recorded and a list of what video data is coming. This can also include a status of transmission of the video data and information on what video data is being transmitted. Thus, chain of custody of the video data is improved over prior art systems.

In Step 414, a retention instruction message is sent from the video collection manager 126 to the video camera 100. In other embodiments, the retention instructions may be standardized or based upon some other set criteria. In embodiments, the video data related to the trigger is transferred to the video collection manager 126, either directly or via the camera dock. This step may be performed at a later time, such as upon the video camera 100 being returned to the camera dock or to a Wi-Fi connection, or may be performed immediately (such as upon a request from the administrator or video collection manager 126 in an emergency situation). The video data may be automatically tagged and assigned to an incident identification number (such as provided by the video collection manager 126). In some embodiments, an original video file is saved separately from any tagged or edited video file, so as to maintain integrity and security of the video data. The tagging allows the video data to be catalogued with other video data (from the same and/or different video cameras) without requiring the user and/or the administrator to manually catalogue. Examples of cataloguing and sorting include: user name, time, date, vehicle or camera identifier, priority level, status, workflow state, incident number, "triggered by" information, event identification, frame triggers (such as speed, acceleration, emergency lights, sirens, etc.). Other activity related to the video may also be logged, such as viewing, outputting, commenting, tagging, editing, removing, and archiving of the video data.

In embodiments of the invention when a user-initiated trigger is received (e.g., a mark button is pressed), the video camera 100 sends metadata, a still image, audio data, or other information to the video collection manager 126. This may be used to alert an administrator of the trigger, to allow for administrator-initiated triggers to be sent to other video cameras, or to perform other functions. For example, the metadata may include a location where the trigger initiated, the time of the trigger, the orientation of the camera during the trigger, and other information related to the camera or the image. Other examples include the speed of the vehicle associated with the video camera 100; other vehicle information (such as an OBD2 monitor or collision sensor); and the activation or deactivation of sirens, lights, brakes, microphones, and other devices.

In some embodiments, upon a press of the mark button the video camera 100 may start live streaming the audio data, periodic still images, or video data to the video collection manager 126 for immediate review (such as in an emergency situation). This may be done at the request of the security administrator (e.g., a remotely given command via the video collection manager 126) or by an indication from the wearer such as a long press, a series of multiple presses of the mark button, or by a certain audible mark.

Other functions may also be performed based upon the information sent to the video collection manager 126. As an example, upon the initiation of a trigger during a traffic stop, the video camera 100 may upload all or a portion of the audio data collected. The audio data sent to the video collection manager 126 may be processed such that certain information may be obtained, a transcript of the audio data is automatically generated, or other functions performed. Based upon the information obtained, an incident report or ticket may be at least partially created or completed. This incident report or ticket may then be sent to the user to assist the user in performing job duties.

As a more specific example, the video collection manager 126 (having received the audio data from the video camera 100) may determine that the user said, "I observed you driving through that stop sign without stopping." Based upon this analysis, the video collection manager 126 may at least partially complete the ticket (e.g., select the correct form and add the specific offense), or may send the information to a computer system in the user's vehicle to perform this function (such as computer 210). The analysis of the audio data may be too computationally intensive to be performed at the video camera 100 or the computer system in the vehicle (such as computer 210), and/or may require internet-based resources to be performed. Other information may also be automatically added to the ticket, such as the user's name, the location of the trigger, the time of the trigger, and other information based upon the metadata.

As another example, a still image of the rear of the vehicle may be automatically sent to the video collection manager 126. Based upon this, the video collection manager 126 may perform an optical character recognition ("OCR") on the still image to determine the license plate number of the vehicle. This information may be used access a database of license plate numbers and/or to fill out at least a portion of the ticket. In other embodiments, the OCR may be performed locally, and this information sent to the video collection manager 126 with the trigger indication and/or the periodic metadata message.

As still another example, a still image of a person's face (such as from a body-worn video camera 100) may be uploaded for facial recognition of that person. This may be performed automatically (e.g., upon each encounter with a person), upon a user-initiated request (e.g., upon a suspicion that fake identification documents have been provided), upon an administrator-initiated request (e.g., subsequent to the recording of the image, upon an emergency situation involving that person such as a fleeing of the scene), or upon a third-party-initiated request.

In some embodiments of the invention, the video collection manager 126 is a dedicated device that communicates with the video camera 100 and/or the camera docks. In other embodiments, the video collection manager 126 is a remote application operating on a server (such as a cloud-based video collection manager). In still other embodiments, the video collection manager 126 is a local application operating on a computer system associated with the facility or organization that administers the video collection system.

In embodiments of the invention, the video collection manager 126 receives the above-discussed messages directly from the video camera 100 and later requests video data related to at least one message from the camera dock. The video collection manager 126 may be communicatively coupled to the camera dock directly or indirectly. Examples of direct communication include a wired or wireless connection between the video collection manager 126 and the camera dock. Indirect connection includes an intermediary device for facilitating the communication. For example, the camera dock may be communicatively coupled to a computer, which in turn communicates with the video collection manager 126. As another example, the camera dock may include a Wi-Fi connection that connects through a wireless router to the video collection manager 126, or a mobile broadband connection.

In embodiments of the invention, the camera dock sends at least a portion of the video data to the video collection manager 126. The camera dock will upload the video data associated with metadata as requested by the video collection manager 126 and/or based upon certain conditions and criteria associated with the metadata. These conditions may be previously determined or set by the video collection manager 126 (or an administrator operating the video collection manager 126 or associated computer platform). The metadata may the upload of certain video data. For example, metadata that may trigger an upload include a long press of the mark button, any press of the mark button, a GPS location, or entry into an unauthorized or abnormal location. As an example, a human operator or automatic process of the video collection manager 126 may manage the available upload bandwidth to prioritize the upload of certain information (e.g., video data) based upon the above-discussed characteristics. Based upon the number of body-mounted cameras in the docks, and the amount of video data to potentially be uploaded, the video collection manager 126 may direct what video data will be uploaded and an order for upload, what video data should be retained on the local body-mounted camera and/or camera dock, what video data should be deleted, etc.

It should be appreciated that various embodiments of the invention could be applied to numerous fields. Examples of the fields of use include law enforcement, emergency response, government vehicle fleets, commercial vehicle fleets, schools, hospitals, commercial warehouses, and other fields of use that use distributed video cameras.

It should be appreciated that, while the above disclosure is directed mainly to the field of law enforcement, some embodiments of the invention are associated with other fields. Some embodiments of the invention are directed to military functions, para-military functions, private security functions, private citizens, etc. For example, the user 22 may be a private citizen and the subject may be an assailant or other malfeasant. The law enforcement field discussed is merely exemplary and should not be construed as limiting.

Another exemplary field of usage for embodiments of the invention will now be discussed. An application-based taxi service may utilize embodiments of the invention for managing drivers. The administrator may send (automatically or manually) information to the driver regarding a certain trip, including a unique trip identifier. The supplied information may also include a pickup time and location, a drop off location, an expected distance, monetary compensation for the driver, information about the passenger, and other information that may be pertinent to the trip. The video camera 100 may begin recording upon pickup and end recording upon drop off. The beginning and ending of the video, the marking with a unique trip identifier associated with the passenger, and the uploading of metadata and/or video data are performed without any additional steps or input from the driver. This provides additional security for both driver and passenger.

Although the invention has been described with reference to the embodiments illustrated in the attached drawing figures, it is noted that equivalents may be employed, and substitutions made herein without departing from the scope of the invention.

Having thus described various embodiments of the invention, what is claimed as new and desired to be protected by Letters Patent includes the following:

1. A video collection manager device comprising:
a mobile broadband modem providing a wireless communication connection with one or more cameras;
at least one processor; and
one or more non-transitory computer-readable media storing computer-executable instructions that, when executed by the at least one processor, perform a method of video capture, the method comprising:
transmitting, to the one or more cameras via the wireless communication connection, a trigger message comprising an indication of a video trigger and an instruction to initiate recording with the one or more cameras,
wherein the trigger message instructs the one or more cameras to transfer video data from a volatile memory to a non-volatile memory of the one or more cameras;
receiving a recording confirmation from the one or more cameras; and
receiving a metadata message from the one or more cameras.

2. The video collection manager device of claim 1, wherein the video collection manager device is a remote video collection manager device disposed in a distinct location from the one or more cameras.

3. The video collection manager device of claim 2, wherein the metadata message comprises location data from a GPS device associated with the one or more cameras.

4. The video collection manager device of claim 1, wherein the metadata message comprises system health metadata associated with the one or more cameras, wherein the system health metadata comprises a further indication of a system failure cause of the one or more cameras.

5. The video collection manager device of claim 1, wherein the metadata message comprises frame metadata corresponding to individual video frames of the video data.

6. The video collection manager device of claim 1, wherein the metadata message comprises event triggering metadata.

7. The video collection manager device of claim 1, further comprising:
a user control device coupled to the at least one processor, the user control device configured to receive user input from a user,
wherein the method further comprises:
responsive to a termination user input received through the user control device, transmitting, to the one or more cameras via the wireless communication connection, a termination message comprising a further instruction to terminate the recording with the one or more cameras.

8. A method of video capture by a video collection manager device, the method comprising:
transmitting, to one or more cameras coupled to the video collection manager device, a trigger message comprising an indication of a video trigger and an instruction to initiate recording with the one or more cameras,
wherein the trigger message instructs the one or more cameras to transfer video data from a volatile memory to a non-volatile memory of the one or more cameras;
receiving a recording confirmation from the one or more cameras;
receiving a metadata message from the one or more cameras, the metadata message comprising location data from a GPS device associated with the one or more cameras; and
transmitting, to the one or more cameras, a termination message comprising a further instruction to terminate the recording with the one or more cameras.

9. The method of claim 8, further comprising:
determining a video retention duration based on a retention policy; and
transmitting, to the one or more cameras, a retention instruction message comprising a further indication of the video retention duration.

10. The method of claim 8, further comprising:
after transmitting the termination message, receiving, from the one or more cameras, a post-recording metadata message comprising post-recording metadata; and
analyzing the post-recording metadata.

11. The method of claim 10, wherein the post-recording metadata comprises video recording confirmation information for authenticating the video data.

12. The method of claim 8, wherein the metadata message comprises location metadata indicative of a location of the one or more cameras, and wherein the termination message is based at least in part on the location of the one or more cameras.

13. The method of claim 8, wherein the metadata message comprises device metadata indicative of a device specific key for the one or more cameras.

14. The method of claim 8, wherein the trigger message is transmitted responsive to a third-party initiated trigger message received via a mobile network.

15. One or more non-transitory computer-readable media storing computer-executable instructions that, when executed by at least one processor, perform a method of video capture with a video collection management device, the method comprising:
transmitting, to one or more cameras coupled to the video collection management device, a trigger message comprising an indication of a video trigger and an instruction to initiate recording with the one or more cameras, wherein the trigger message instructs the one or more cameras to transfer video data from a volatile memory to a non-volatile memory of the one or more cameras;
receiving a recording confirmation from the one or more cameras;
receiving a metadata message from the one or more cameras; and
transmitting, to the one or more cameras, a termination message comprising a further instruction to terminate the recording with the one or more cameras.

16. The one or more non-transitory computer-readable media of claim 15, wherein the termination message is transmitted responsive to a predetermined time duration associated with the video trigger.

17. The one or more non-transitory computer-readable media of claim 15, wherein the termination message is transmitted responsive to an administrator user input.

18. The one or more non-transitory computer-readable media of claim 15, wherein the trigger message and the termination message are transmitted remotely via a wireless communication connection of the video collection management device.

19. The one or more non-transitory computer-readable media of claim 15, wherein the metadata message comprises status metadata indicative of a status of the one or more cameras.

20. The one or more non-transitory computer-readable media of claim 15, wherein the metadata message comprises a periodic metadata message transmitted periodically with the one or more cameras, the periodic metadata message comprising recording confirmation information indicative of the video data.

* * * * *